United States Patent [19]

Howard

[11] Patent Number: 5,022,751

[45] Date of Patent: Jun. 11, 1991

[54] PORTABLE LOCALIZER SITING SYSTEM

[75] Inventor: Bruce S. Howard, Mercer Island, Wash.

[73] Assignee: Sundstrand Data Control, Inc., Redmond, Wash.

[21] Appl. No.: 396,495

[22] Filed: Aug. 21, 1989

[51] Int. Cl.⁵ .......................... G01C 3/00; G01C 3/08; G01B 11/26

[52] U.S. Cl. ........................................... 356/1; 342/33; 342/34; 342/35; 342/410; 356/5; 356/141

[58] Field of Search ....................... 356/1, 5, 141, 152; 342/33, 34, 35, 410, 412, 413

[56] References Cited

U.S. PATENT DOCUMENTS 3,664,748  5/1972  Bezu .................................... 356/152
3,690,767  9/1972  Missio et al. ........................... 356/5
4,614,426  9/1986  Baxter et al. ............................ 356/1

Primary Examiner—Stephen C. Buczinski
Attorney, Agent, or Firm—Michael S. Yatsko

[57] ABSTRACT

A portable siting system particularly useful for siting a portable localizer for a collocated approach guidance system for aircraft utilizes a laser range finder in conjunction with a shaft encoder to determine the distance between the localizer and two arbitrary points along a runway center line as well as the azimuth offset between the two points. A microprocessor is used to compute the number of degrees the antenna of the localizer must be rotated so that its beam intersects the extended runway center line at a predetermined point based on trigonometric computations performed on the two measured distances and the measured angle.

14 Claims, 1 Drawing Sheet

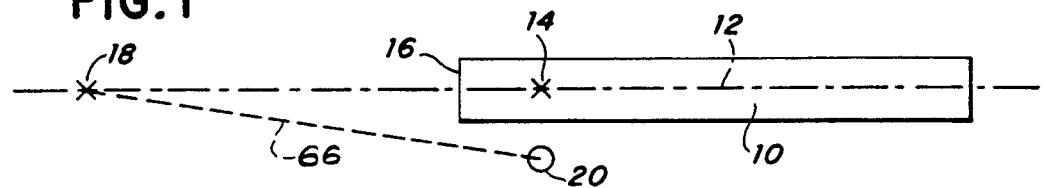
FIG. 1
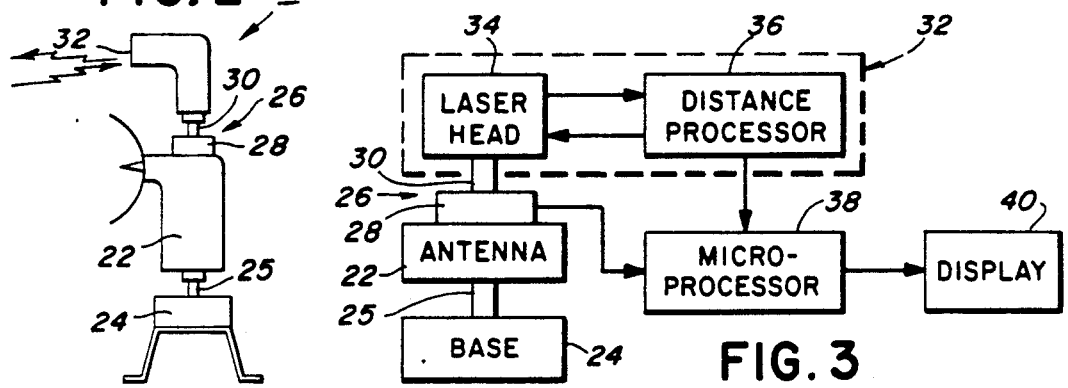
FIG. 2
FIG. 3
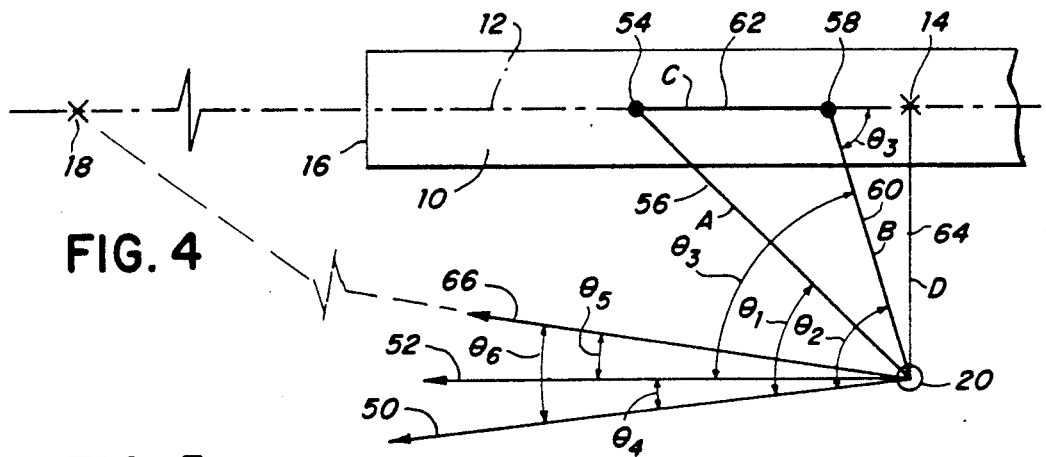
FIG. 4
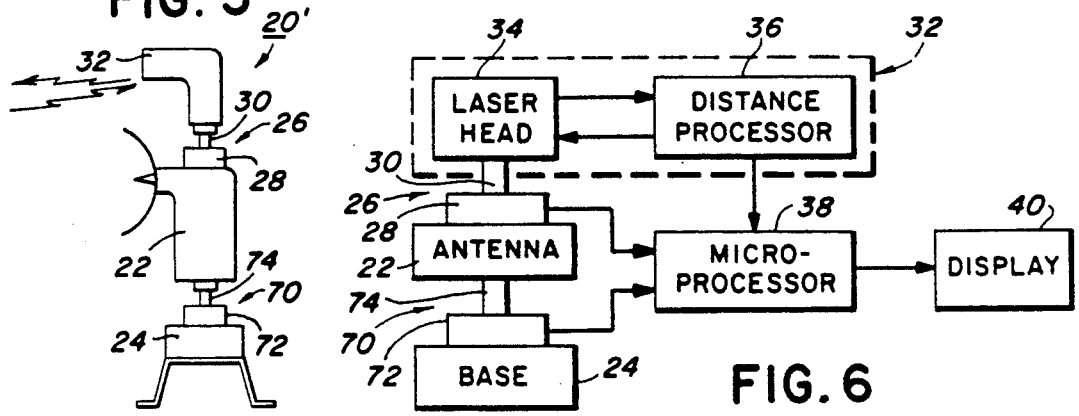
FIG. 5
FIG. 6

PORTABLE LOCALIZER SITING SYSTEM

BACKGROUND OF THE INVENTION

1. Field of the Invention

This invention relates generally to siting aids, and more particularly to a siting system particularly useful for precisely locating a portable ground station or localizer for an azimuth guidance system for aircraft.

Various azimuth guidance systems and ways to site those systems are known In a typical azimuth approach system, a ground station is employed to transmit a beam containing azimuth information to provide guidance to a pilot of an approaching aircraft Such azimuth guidance systems utilize ground stations that may be located at either the take off end of the runway or at the approach end of the runway near the touchdown point. In either case, it is important accurately to orient the beam or boresight of the ground station antenna to assure accurate guidance information. When the ground station is located at the take off end of the runway, the location of the ground station and the proper orientation of the antenna can readily be determined because the station is located along the center line of the runway and its antenna is pointed so that a boresight located on the antenna parallel to the center of the antenna beam follows the center line of the runway. Thus, the location of the station and the orientation of the antenna can be readily accomplished by sighting along the runway through a telescope or transit.

Alternatively, the ground station can be located near the approach end of the runway at a point adjacent to the runway near the touchdown point. A system having the ground station or localizer thus located is called a collocated system. Because the station is not located on the center line of the runway, if the antenna were pointed in a direction so that its beam ran parallel to the runway, the pilot would be guided to a location adjacent the runway. Consequently, the antenna is angled toward the runway so that the beam intersects an extended center line of the runway at a a predetermined point ahead of the touchdown point, typically 3816 feet. At this point the aircraft should be at its decision height (DH). The decision height is defined as a specified height at which a missed approach must be initiated if the required visual reference to continue the approach to land has not been established. The term required visual reference means that a section of the visual aids or of the approach area should have been in view for a sufficient time for the pilot to have made an assessment of the aircraft position and rate of change of position, in relation to the desired flight path. The angle that the boresight of the antenna is offset relative to a line parallel to the runway center line is called the pointing angle.

One way to orient the antenna of the ground station so that the beam intersects the extended runway center line at the point and utilize a telescope or a boresight located on the antenna to sight the person or marker through the telescope or boresight to determine the proper orientation of the antenna. While this solution may be satisfactory for civilian installation where access to the decision height point is available or for fixed installations where the orientation of the antenna is seldom changed, it is not a very satisfactory solution for portable installations, particularly military installations wherein the sites are often moved and the decision height point may not be accessible.

Thus, for such installations, the pointing angle must be calculated indirectly. One way to do so is to utilize a magnetic compass to determine the heading at various points and to calculate the pointing angle from the differences in heading. However, magnetic compasses do not provide the accuracy required, are effected by magnetic material in the vicinity and are unusable in polar latitudes.

Another method is to measure distances to predetermined points along the runway, place stakes into the ground at those points, and use triangulation techniques to determine the appropriate pointing angle. However, while such a technique provides accurate results, the distances that must be measured to provide the required accuracy require the use of very long tape measures on the order of 300 feet long. Unfortunately, such tape measures are very heavy and their weight is a disadvantage, particularly in portable applications.

SUMMARY OF THE INVENTION

Accordingly, it is an object of the present invention to provide a siting system that overcomes many of the disadvantages of the prior art systems.

It is another object of the present invention to provide a siting system particularly useful for portable aircraft approach guidance systems.

It is another object of the invention to provide a portable approach guidance system that is self-siting and particularly useful for military applications.

It is another object of the invention to provide a siting system for an approach guidance system that utilizes a laser range finder in conjunction with a shaft encoder for automatically calculating the pointing angle of the antenna of the guidance system.

Briefly, in accordance with the invention, a laser range finder is collocated with the approach system ground station. The laser range finder is rotatably mounted in a location close to the antenna, and one or more shaft encoders are utilized to determine the relative orientation of the antenna and the range finder. A microprocessor is employed to calculate the pointing angle based on two measured distances and one angle, the two measured distances being the distance between the range finder and each of two arbitrary points along the runway center line, and the angle being the difference in azimuth between the two arbitrary points.

BRIEF DESCRIPTION OF THE DRAWING

These and other objects and advantages of the present invention will become readily apparent upon consideration of the following detailed description and attached drawing, wherein:

FIG. 1 is a plan view of an aircraft runway showing the location of a collocated azimuth ground station;

FIG. 2 is a schematic representation of the mechanical aspects of a ground station for use with the system according to the invention;

FIG. 3 is a block diagram of the electronic and processing circuitry of the system according to the invention;

FIG. 4 is a plan view of the approach end of a runway illustrating the various angles used to determine the pointing angle;

FIG. 5 is a schematic representation of the mechanical aspects of an alternative embodiment of the invention; and FIG. 6 is a block diagram of the electronic circuitry of the embodiment of FIG. 5.

DETAILED DESCRIPTION

Referring now to the drawing, with particular attention to FIG. 1, there is shown a typical runway 10. The runway 10 has a center line 12 and an aircraft touchdown point 14 where approaching aircraft typically touch down. The touchdown point 14 is typically on the order of 1000 to 1500 feet from an approach end 16 of the runway 10. A decision height point 18 is positioned on an extended portion of the center line 12 of the runway 10. The decision height is defined as a specified height at which a missed approach must be initiated if the required visual reference to continue the approach to land has not been established. The term required visual reference means that a section of the visual aids or of the approach area should have been in view for a sufficient time for the pilot to have made an assessment of the aircraft position and rate of change of position, in relation to the desired flight path.

In a collocated system, a localizer 20 is positioned adjacent the runway 10 near the touchdown point 14 to provide azimuth guidance to approaching aircraft. The antenna of the localizer 20 must be oriented so that the transmitted beam of the antenna intersects the extended center line of the runway 12 at the decision height point 18.

The split site PTAG (Precision Tactical Approach Guidance) system, with localizer at the departure end of the runway, aligned with the centerline, is designed to meet the performance requirements of United States Standard Flight Inspection Manual, OA P 8200.1, changes 1 through 44, for Category I ILS facility performance. Collocated glideslope and localizer systems are not defined in this document. Split site localizer azimuth alignment accuracy is specified as being within +/−15 uAMPS of the designed procedural azimuth at runway threshold. This corresponds to a distance of +/−35 feet at runway threshold for runway lengths exceeding 6,678 feet. Alignment accuracy for a collocated system has been modeled after those requirements for split site installations. Collocated alignment accuracy is hereby defined as a maximum allowable azimuth alignment error of +/−35 feet about the extended runway centerline at the intercept of the decision height altitude. The horizontal distance along the extended runway centerline between the localizer emplacement point and the decision height is 3816 feet. Total system alignment tolerance at decision height is therefore +/− arctangent (35 / 3816) or +/−0.53 degrees. Maximum allowable siting accuracy is 20 percent of the total system error budget, corresponding to +/−0.11 degrees.

A system capable of determining the azimuth of the beam of the antenna of the localizer 20 to the desired accuracy is illustrated in FIG. 2. Referring to FIG. 2, the localizer ground station 20 includes an antenna 22 that is rotatably mounted to a base 24 by a shaft 25 or other suitable mechanism that permits rotation of the antenna 22 with respect to the base 24. The base 24 may contain the localizer transmitter and the electronics required to perform the siting function. In addition, a shaft encoder 26 having a body portion 28 and a shaft 30 is mounted on the antenna 22 so that the body of the shaft encoder is rigidly affixed to the antenna 22. A laser range finder 32 or other optical range finder having the required accuracy is mounted to the shaft 30 of the encoder 26 so that the range finder 32 may be rotated with respect to the antenna 22 and the angular displacement between the antenna 22 and the range finder 32 may be measured by the shaft encoder 26.

Various optical range finders may be utilized as the range finder 32, and an Eldi 10 electronic distance meter manufactured by Carl Zeiss Incorporated of West Germany having an office at One Zeiss Drive, Thornwood, N.Y., has been found to be particularly suitable for use as the range finder 32. The range finder 32 is an electro-optical infrared pulsed light system that has a maximum range of from 5 to 10 miles depending on visibility and the sophistication of the optics used in the system. The range finder 32 has a liquid crystal display (not shown) and a data output port that permits the measured distance data to be utilized by other devices. The distance measurement is provided by a laser head 34 (FIG. 3) that transmits an infrared pulsed laser beam and receives reflections from an object located at a distant point. Such an object may be an optical retroreflector, a piece of reflective tape or any other target which is highly reflective to infrared light. The head 32 also includes a telescope (not shown) that permits the head 32 to be accurately aimed by an operator who sights through the telescope and places a set of cross-hairs in the viewing field of the telescope on the object whose range is desired.

The reflected light is received and detected by the laser head 34 and applied to a distance processor which processes the received signal to determine the phase shift between the transmitted and received light to thereby determine distance. The distance measurement is then applied to a microprocessor 38 which also receives information defining the relative angle between the laser head 34 and the antenna 22. Based on the angle and distance information input to the microprocessor 38, the microprocessor 38 calculates various distances and angles utilizing trigonometric functions, particularly the law of cosines. The results of the computations are displayed on a display 40.

In order to set up the site of the localizer 20, the localizer transmitter is first placed adjacent the runway near the touchdown point at an arbitrary distance D (FIG. 4) from the touchdown point 14. Typically, the distance D may be on the order of 50 to 150 feet from the touchdown point 14. The station is then oriented so that the beam of the antenna points in a direction generally parallel to the center line 12 of the runway 10, as evidenced, for example, by the direction of the boresight on the antenna 12 is pointing. The direction of the antenna beam and boresight is illustrated by a line 50 (FIG. 4), and a line 52 illustrates a line parallel to the runway center line 12. Preferably, the direction of the line 50 should be within ±1520 of the direction of the line 52. Next, a first site point 54 is arbitrarily selected along the center line 12 of the runway 10. This site is marked, for example, by having a man stand at the site point 54. The distance A along a line 56 between the site 20 and the site point 54 is measured utilizing the range finder by pointing the range finder at a reflective target placed at the site point 54 and measuring the distance between him and the localizer station. The distance A along the line 56 is displayed for the benefit of the operator and stored in a memory within the microprocessor 38. Also, the value of an angle $\theta_1$ between the antenna bore site line 50 and the line 56 is obtained from the shaft encoder 26 and stored within the microprocessor 38, and displayed if desired.

A distance B is then measured between the localizer 20 and a second arbitrary site point 58 along the center line 12 of the runway 10 in a similar manner. An angle $\theta_2$ between the antenna bore site line 50 and a line 60 between the localizer 20 and the site point 58 is also taken. The distances and angles thus measured contain enough information to permit the antenna to be oriented so that its bore site intersects the decision height point 18.

The computations performed by the microprocessor 38 to determine the angle through which the localizer antenna must be turned to intersect the runway center line at the desired point utilize the law of cosines and other trigonometric functions and apply them to the measured angles and distances. There are various ways that the required pointing angle can be determined and the following derivation is given for illustrative purposes only.

The law of cosines is as follows:

$$A^2 = B^2 + C^2 - 2BC \cos a$$

wherein:

A, B and C are the three sides of any triangle, and a is the angle opposite side A. The sides B and C can be calculated in a similar fashion using the other two sides and the angle b or c opposite the side whose length is to be calculated.

Applying the law of cosines to FIG. 4, the distance C along a line 62 between the site points 54 and 58 is calculated as follows:

$$C = [A^2 + B^2 - 2AB \cos(\theta_2 - \theta_1)]^{\frac{1}{2}}$$

In the above equation, A and B are the measured distances to the site points 54 and 58 and the quantity $(\theta_2 - \theta_1)$ represents the angle between the lines 56 and 60.

Once the distance C has been determined, an angle $\theta_3$ which is the angle between a line parallel to the runway and the line 60 can be determined utilizing the following formula.

$$\theta_3 = 180° - \arccos[(A^2 - B^2 - C^2)/(-2BC)]$$

Knowing $\theta_3$, the amount of offset of the antenna bore site from a line parallel to the runway, $\theta_4$, can be calculated by the equation:

$$\theta_4 = \theta_2 - \theta_3$$

Knowing $\theta_3$, the distance D along a line 64 that is perpendicular to the runway center line 12 and intersects the site of the localizer 20 can be calculated utilizing the following equation:

$$D = B \sin \theta_3$$

Knowing the value of D, the angle of the desired bore site azimuth, as illustrated by a line 66, relative to the line 52 can be determined by calculating an angle $\theta_5$ as follows:

$$\theta_5 = \arctan(D/3816)$$

The number 3816 represents the distance in feet between the touchdown point 14 and the decision height point 8. The angle $\theta_6$ which is the angle that the localizer antenna must be rotated from its present position is determined by adding $\theta_4$ and $\theta_5$ as follows:

$$\theta_6 = \theta_4 + \theta_5$$

The magnitude of the angle $\theta_6$ is displayed to the operator, and in the embodiment illustrated in FIG. 2, the operator then turns the range finder head 32 until the correction angle reads 0°. The range finder head 32 is then held stationary with respect to the antenna 22 to maintain the displayed 0° correction angle, and the entire antenna and range finder assembly is turned relative to the supporting structure until the range finder 32 is again aligned with the site point 58. When the range finder head is aligned with the site point 58, the antenna 22 is properly oriented.

In order to simplify the siting process so that the operator need not rotate the range finder 32 and antenna 22 in unison while looking through the range finder sight, a second shaft encoder may be interposed between the localizer antenna 22 and base unit 24 in addition to shaft encoder 26 positioned between the antenna 22 and the range finder 32.

As is illustrated in FIG. 5, a shaft encoder 70 replaces the shaft 25 in a station 20'. The station 20' in FIG. 5 is identical to the station 20 of FIG. 2 except for the addition of the shaft encoder 70 that has a body 72 affixed to the base 24 and a shaft 74 attached to the antenna 22. The use of the shaft encoder 70 permits the azimuth of the antenna 22 to be determined independently of the position of the range finder 32, thus permitting the antenna 22 to be oriented to the proper pointing angle without the need for sighting through the range finder 32 while the antenna is being properly oriented.

The electronics for the embodiment illustrated in FIG. 5 are illustrated in FIG. 6. The electronics illustrated in FIG. 6 are the same as those illustrated in FIG. 3 except that the microprocessor has an additional input from the shaft encoder 70.

The operation of the embodiment illustrated in FIG. 5 will be similar to that of the embodiment illustrated in FIG. 2 except that the antenna 22 and the range finder 32 will not need to be turned in unison while the operator sights through the range finder 32. The calculation of the pointing angle will be made in the same manner as discussed in conjunction with the embodiment shown in FIG. 2 utilizing the range finder 32 and the shaft encoder 26 to provide distance and angle information to the microprocessor 38 to determine the angle $\theta_6$ that the antenna must be turned to achieve the proper orientation. However, once the angle $\theta_6$ has been calculated, the microprocessor switches from the shaft encoder 26 to the shaft encoder 70. When this occurs, the orientation of the antenna 22 is measured with respect to the base 24 which is fixed relative to the earth. Consequently, the proper orientation can now be achieved by simply rotating the antenna until the displayed error is reduced to zero without any need for sighting through the telescope of the range finder 32.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A self-siting ground station for an azimuth guidance system for guiding aircraft on approach to a runway, comprising:
   a supporting structure;

a rotatably mounted antenna having a predetermined directional transmitting beam supported by supporting structure, said antenna being rotatable in azimuth;

a rotatably mounted range finder collocated with said antenna, said range finder having a predetermined sighting direction and being rotatable in azimuth;

means coupled to said antenna and to said range finder for providing a signal representative of the difference in azimuth between the direction of the transmitting beam of the antenna and the sighting direction of the range finder; and computing means responsive to two measured distances between the range finder and each of two arbitrary points along the runway and responsive to the difference in azimuth between the two points for determining the azimuth of the direction of the transmitting beam of the antenna required to cause the transmitting beam to intersect a third predetermined point above an extended portion of a line connecting said two arbitrary points.

2. A self-siting ground station as recited in claim 1 wherein said range finder is an optical range finder.

3. A self-siting ground station as recited in claim 2 wherein said range finder is an infrared range finder.

4. A self-siting ground station as recited in claim 3 wherein said azimuth difference signal providing means includes a shaft encoder.

5. A self-siting ground station as recited in claim 4 further including a second shaft encoder interposed between said antenna and said supporting structure for providing a signal representative of the rotary orientation of the antenna relative to the supporting structure.

6. A method for siting a portable ground station for an aircraft azimuth guidance system comprising:

colocating a laser range finder that is rotatable in azimuth with the ground station;

placing the ground station and the range finder at an arbitrary point beside a runway;

using the range finder to measure the distance and azimuth to each of two arbitrary points along the center line of the runway;

using a microprocessor coupled to the range finder and responsive to the range and azimuth information for determining the azimuth of a third point located at a predetermined position on an extended center line of the runway; and rotating the antenna to the azimuth thus determined so that the transmitting beam of the antenna intersects the extended runway center line at the third point.

7. A portable self-siting localizer, comprising:

a base;

means for generating localizer signals;

a directional antenna having a predetermined directional transmitting beam pattern rotatably supported by said base and electrically coupled to said localizer signal generating means;

an optical range finder rotatably supported by said base;

means coupled to said antenna and to said range finder for determining the orientation thereof; and computing means coupled to said range finder and to said orientation determining means and receiving range and orientation data therefrom, said computing means being responsive to measured range and orientation data obtained by measuring the range and orientation to first and second arbitrary points along the runway for computing the orientation of the antenna required for the beam of the antenna to intersect a third predetermined point above an extended portion of a line connection said two arbitrary points.

8. A portable self-siting localizer as recited in claim 7 wherein said localizer is disposed adjacent a runway having a longitudinally extending center line, and wherein said first and second points are located on the runway along the center line thereof and said third point is located off of said runway along an extension of said center line.

9. A self-siting localizer as recited in claim 7 further including means coupled to said computing means for displaying the change in orientation of the antenna required to orient the antenna so that the beam thereof intersects the third predetermined point.

10. A self-siting localizer as recited in claim 7 wherein said orientation determining means includes a shaft encoder disposed between said antenna and said range finder.

11. A self-siting localizer as recited in claim 7 wherein said orientation determining means includes a shaft encoder disposed between said antenna and said base.

12. A self-siting localizer as recited in claim 7 wherein said range finder is an active range 13. A self-siting localizer as recited in claim 12 wherein said range finder includes a laser.

14. A self-siting range finder as recited in claim 12 wherein said range finder is a pulsed infrared range finder.

* * * * *